United States Patent
Seo et al.

(10) Patent No.: US 11,055,052 B2
(45) Date of Patent: Jul. 6, 2021

(54) DISPLAY APPARATUS FORMING WALL DISPLAY AND CONTROLLING METHOD THEREOF

(71) Applicant: SAMSUNG ELECTRONICS CO., LTD., Suwon-si (KR)

(72) Inventors: Jeongryeol Seo, Suwon-si (KR); Sangwon Kim, Suwon-si (KR); Youngkook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/829,495

(22) Filed: Mar. 25, 2020

(65) Prior Publication Data

US 2020/0326899 A1    Oct. 15, 2020

(30) Foreign Application Priority Data

Apr. 15, 2019 (KR) .................. 10-2019-0043925

(51) Int. Cl.
*G06F 3/14* (2006.01)

(52) U.S. Cl.
CPC .......... *G06F 3/1446* (2013.01); *G06F 3/1438* (2013.01)

(58) Field of Classification Search
CPC ............................ G06F 3/1446; G06F 3/1438
See application file for complete search history.

(56) References Cited

U.S. PATENT DOCUMENTS

| 10,095,460 B2 | 10/2018 | Choi |
| 2008/0143637 A1 | 6/2008 | Sunahara et al. |
| 2012/0319926 A1 | 12/2012 | Koebrich et al. |
| 2016/0034242 A1 | 2/2016 | Cho et al. |
| 2016/0103476 A1 | 4/2016 | Kim et al. |
| 2018/0018931 A1 | 1/2018 | Zhang |
| 2018/0181252 A1 | 6/2018 | Park et al. |
| 2018/0277024 A1 | 9/2018 | Hall |

FOREIGN PATENT DOCUMENTS

| EP | 3410426 A1 | 12/2018 |
| JP | 4065471 B2 | 3/2008 |
| JP | 5119655 B2 | 1/2013 |
| JP | 2016-45445 A | 4/2016 |
| KR | 10-2014-0017740 A | 2/2014 |

(Continued)

OTHER PUBLICATIONS

Communication dated May 6, 2020 issued by the European Intellectual Property Office in counterpart European Application No. 20165804.4.

(Continued)

*Primary Examiner* — Peter D McLoone

(74) *Attorney, Agent, or Firm* — Sughrue Mion, PLLC

(57) ABSTRACT

A display apparatus included in a wall display includes a first input interface, a first output interface, a second output interface, a plurality of display modules, and a processor configured to, based on an image signal being received through the first input interface, display an image corresponding to a position of the display apparatus on the wall display through the plurality of display modules based on the received image signal, and transmit the received image signal to a first display apparatus and a second display apparatus included in the wall display through the first output interface and the second output interface, respectively.

17 Claims, 12 Drawing Sheets

(56) References Cited

FOREIGN PATENT DOCUMENTS

| | | |
|---|---|---|
| KR | 10-2016-0067525 A | 6/2014 |
| KR | 10-2017-0025950 A | 3/2017 |
| WO | 03/034396 A1 | 4/2003 |
| WO | 2017/054886 A1 | 4/2017 |

OTHER PUBLICATIONS

International Search Report dated Jul. 14, 2020 issued by the International Searching Authority in counterpart International Application No. PCT/KR2020/004798 (PCT/ISA/210).
International Written Opinion dated Jul. 14, 2020 issued by the International Searching Authority in counterpart International Application No. PCT/KR2020/004798 (PCT/ISA/237).
Communication dated Apr. 12, 2021 by the European Patent Office in counterpart European Patent Application No. 20165804.4.

| 100-1 | 100-2 | 100-3 | 100-4 |
| 100-5 | 100-6 | 100-7 | 100-8 |
| 100-9 | 100-10 | 100-11 | 100-12 |
| 100-13 | 100-14 | 100-15 | 100-16 |

DISPLAY APPARATUS FORMING WALL DISPLAY AND CONTROLLING METHOD THEREOF

CROSS-REFERENCE TO RELATED APPLICATION(S)

This application is based on and claims priority under 35 U.S.C. § 119 to Korean Patent Application No. 10-2019-0043925, filed on Apr. 15, 2019 in the Korean Intellectual Property Office, the disclosure of which is incorporated by reference herein in its entirety.

BACKGROUND

1. Field

The disclosure relates to a display apparatus forming a wall display and a controlling method thereof and more particularly, to a display apparatus that is connected to at least one display apparatus to form a wall display and a controlling method thereof.

2. Description of Related Art

A wall display is a display in which a plurality of display apparatuses for outputting an image are arranged in a plane, and each of the plurality of display apparatuses arranged outputs a portion of one image so that the plurality of display apparatuses operate like one display apparatus having a large screen.

Such a wall screen displays a high resolution image on a large screen, providing visual satisfaction to a user.

Recently, a wall display is installed in various places such as shopping malls, performance halls, exhibition halls, fairs, and the like, and accordingly, wall display-related technologies are also increasing.

In particular, one image is displayed on a plurality of display apparatuses included in a wall display and thus, a technology related to the method of transmitting an image to a plurality of display apparatuses is required.

In this regard, recently, in order to transmit an image to a plurality of display apparatuses in a wall display in a stable manner, a redundancy technology is used that transmits the same image in the opposite direction to the direction in which the image is transmitted in the wall display.

Specifically, if a display apparatus in a wall display does not receive an image or there is an error in the received image, the display apparatus may display the image using the redundancy image.

However, in this case, a plurality of identical images (the original image and the redundancy image) should be transmitted to the display apparatus in the wall display and thus, there is a problem of low efficiency.

In addition, when a plurality of display apparatuses are arranged in a row, it is difficult to transmit a redundancy image.

The above information is presented as background information only to assist with an understanding of the disclosure. No determination has been made, and no assertion is made, as to whether any of the above might be applicable as prior art with regard to the disclosure.

SUMMARY

According to embodiments, there is provided a display apparatus that transmits an image to a plurality of display apparatuses in a wall display efficiently and a controlling method thereof.

In accordance with an aspect of the disclosure, there is provided a display apparatus which includes a first input interface, a first output interface, a second output interface, a plurality of display modules, and a processor configured to, based on an image signal being received through the first input interface, display an image corresponding to a position of the display apparatus on the wall display through the plurality of display modules based on the received image signal, and transmit the received image signal to a first display apparatus and a second display apparatus forming the wall display through the first output interface and the second output interface, respectively In accordance with an aspect of the disclosure, there is provided a controlling method of a display apparatus forming a wall display which includes: receiving an image signal through a first input interface, displaying an image corresponding to a position of the display apparatus in the wall display through a plurality of display modules included in the display apparatus based on the received image signal, and transmitting the received image signal to a first display apparatus and a second display apparatus forming the wall display through the first output interface and the second output interface, respectively.

According to embodiments, a display apparatus forming a wall display may transmit an image to a plurality of display apparatuses at once and thus, may transmit an image to another display apparatus in the wall display without following a standardized order or method.

In addition, a user may add a display apparatus without performing the operation of disconnecting or resetting a cable wire connection connected between display apparatuses in the wall display.

Accordingly, the wall display may be more expanded, and a user may display an image by disposing a plurality of display apparatuses in various forms.

Meanwhile, a display apparatus according to the various embodiments may receive the same image from a plurality of display apparatuses and thus, the display apparatus does not need to transmit an image for redundancy of the display apparatus separately. Accordingly, the efficiency of the display apparatus may increase.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1B is a view provided to explain a display apparatus according to an embodiment;

DETAILED DESCRIPTION

Figure 1A:
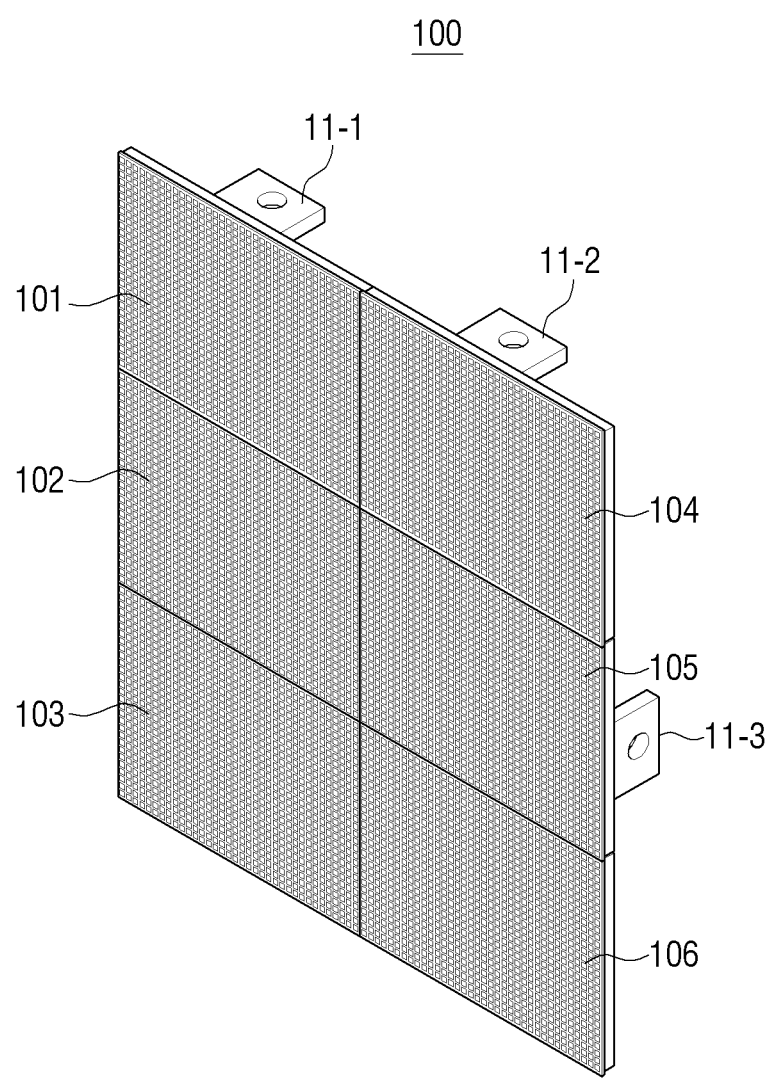
FIG. 1A is a view provided to explain a display apparatus according to an embodiment.

Hereinafter, various embodiments of the disclosure will be described. However, it should be noted that the various embodiments are not for limiting the scope of the disclosure to a specific embodiment, but they should be interpreted to include all modifications, equivalents and/or alternatives.

In this specification, the terms 'comprise', 'may comprise', 'include', or 'may include' refer to the presence of the corresponding features (e.g., numbers, functions, operations, or components such as parts) but do not exclude the presence or possibility of addition features.

In the description, the term "A or B", "at least one of A or/and B", or "one or more of A or/and B" may include all possible combinations of the items that are enumerated together. For example, the term "A or B", "at least one of A and B", or "at least one of A or B" means (1) including at least one A, (2) including at least one B, or (3) including both at least one A and at least one B.

The terms "first", "second", or the like, used in the disclosure may indicate various components regardless of a sequence and/or importance of the components, will be used only in order to distinguish one component from the other components, and do not limit the corresponding components. For example, the first user device and the second user device may represent different user devices regardless of the order or importance. For example, without departing from the scope of rights described in this specification, a first component may be named a second component and similarly, the second component may be named the first component.

In the present disclosure, a 'module' or a 'unit' performs at least one function or operation and may be implemented by hardware or software or a combination of the hardware and the software. In addition, a plurality of 'modules' or a plurality of 'units' may be integrated into at least one module or chip and may be implemented as at least one processor except for 'modules' or 'units' that should be realized in a specific hardware.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component). On the other hand, when it is mentioned that any component (for example, a first component) is "directly coupled with/to" or "directly connected to" to another component (for example, a second component), it is to be understood that the other component (for example, a third component) is not present between any component and another component.

An expression "configured (or set) to" used in the disclosure may be replaced by an expression "suitable for", "having the capacity to", "designed to", "adapted to", "made to", or "capable of" depending on a context. A term "configured (or set) to" may not necessarily mean only "specifically designed to" in hardware. Instead, in any context, an expression "an apparatus configured to" may mean that the apparatus is "capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

The terms used herein is for the purpose of describing particular embodiments only and may not intend to limit the scope of other embodiments. Singular expressions may include plural expressions unless the context clearly indicates otherwise. The terms used herein, including technical or scientific terms, may have the same meaning as commonly understood by those skilled in the art described in this specification. Among the terms used in this specification, terms defined in the general dictionary may be interpreted as having the same or similar meaning as the meaning in the context of the related art, and they should not be interpreted to have excessively formal meaning unless clearly defined in this specification. In some cases, even if terms are defined in this specification, they may not be interpreted to exclude embodiments of this specification.

Hereinafter, the present disclosure will be described in greater detail with reference to accompanying drawings. However, in describing the present disclosure, when it is determined that a detailed description of a related known function or configuration may unnecessarily obscure the gist of the present disclosure, the detailed description will be omitted. In connection with the description of the drawings, similar reference numerals may be used for similar components.

Figure 1C:
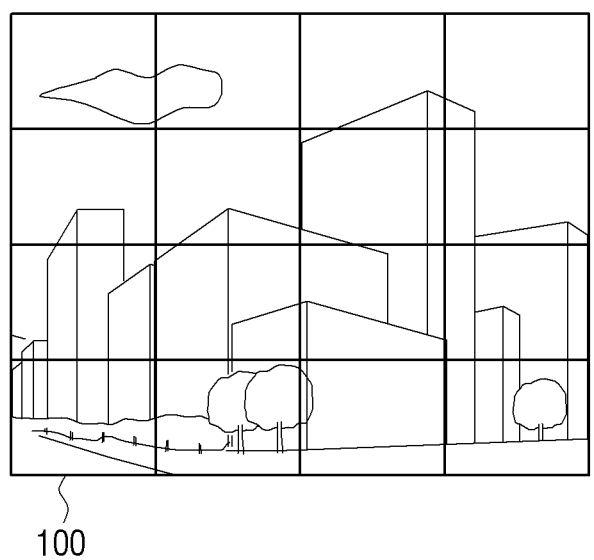
FIG. 1C is a view illustrating an image displayed by a display apparatus in a wall display according to an embodiment.

FIGS. 1A to 1C are views provided to explain a display apparatus according to an embodiment.

A display apparatus 100 according to an embodiment is a modular display forming a wall display, and may be a cabinet. The display apparatus 100 according to an embodiment may include at least one display module.

For example, referring to FIG. 1A, the display apparatus 100 according to an embodiment may include six display modules 101, 102, 103, 104, 105, and 106. Here, each of the display modules 101, 102, 103, 104, 105, and 106 may be connected physically.

For example, the display apparatus 100, as illustrated in FIG. 1A, may be configured such that a plurality of display modules 101, 102, 103, 104, 105, and 106 are connected in the arrangement of 2×3.

Here, the light emitting diode (LED) display modules in the arrangement of 2×3 are only an example, and the arrangement type and number of the LED display modules may be changed in various ways.

The display apparatus 100 may include a base plate (not illustrated) on which each of the display modules 101, 102, 103, 104, 105, and 106 may be mounted. Here, the base plate (not illustrated) may be implemented in a form that each display module is mounted on the front of the base plate.

Meanwhile, the display apparatus 100 according to an embodiment may include a plurality of coupling parts 11-1, 11-2 and 11-3 that can be combined with other display apparatuses (not illustrated). Meanwhile, the position and the number of the coupling parts in FIG. 1A are only an example, and the position and the number of the coupling parts may be changed in various ways.

Accordingly, the display apparatus 100 according to an embodiment may be implemented as a modular display apparatus such as a wall display by combining with other display apparatuses.

Referring to FIG. 1B, a plurality of display apparatuses 100-1 to 100-16 may be combined in the form of 4×4 to implement a wall display 1000. Here, the wall display of 4×4 arrangement is only an example, and the arrangement type and number of the display apparatuses may be changed in various ways.

The wall display 1000 may display an image through a plurality of display modules included in each of the plurality of display apparatuses 100-1 to 100-16. Here, the image may be an image input to one display apparatus 100 in the wall display 1000 from an external device (not illustrated) or may be an image pre-stored in the wall display 1000.

In order for the plurality of display apparatuses 100-1 to 100-16 of the wall display 1000 to display an image, the plurality of display apparatuses 100-1 to 100-16 may transmit an image signal to each other. Here, the image signal may include a video signal, an audio signal, and a synchronization signal for synchronizing a plurality of display apparatuses. Meanwhile, the plurality of display apparatuses 100-1 to 100-16 may transmit not only an image signal but also a control signal, etc. for controlling a display apparatus.

In particular, at least one display apparatus 100 included in the wall display 1000 may transmit an image signal to a plurality of display apparatuses simultaneously.

For example, the display apparatus 100-13 in FIG. 1B may transmit an image signal to the display apparatus 100-9 and the display apparatus 100-14 simultaneously. Likewise, the display apparatus 100-14 may transmit an image signal to the display apparatus 100-10 and the display apparatus 100-15.

As such, each of the plurality of display apparatuses 100-1 to 100-16 forming the wall display may transmit an image to a display apparatus in the wall display, and the display apparatus which receives the image may display the received image.

In this regard, FIG. 1C is a view illustrating an image displayed by a display apparatus in a wall display according to an embodiment.

The display apparatus 100 may display part of an image displayed on the wall display 1000 in consideration of the position of the display apparatus 100 in the wall display 1000.

For example, as illustrated in FIG. 1C, if the wall display 1000 displays an image through a plurality of display apparatuses, the display apparatus 100 may display a lower left part of an image displayed on the wall display 1000.

To do so, each of the plurality of display apparatuses 100-1 to 100-16 in the wall display 1000 may have position information of a display apparatus in the wall display such as coordinates information. In addition, an image signal transmitted to the plurality of display apparatuses in the wall display 1000 may include position information of each of the plurality of display apparatuses.

The display apparatus which receives an image signal including the position information of the plurality of display apparatuses 100 forming the wall display may display an image corresponding to the position of the display in consideration of the position information of the display apparatus.

Figure 2:
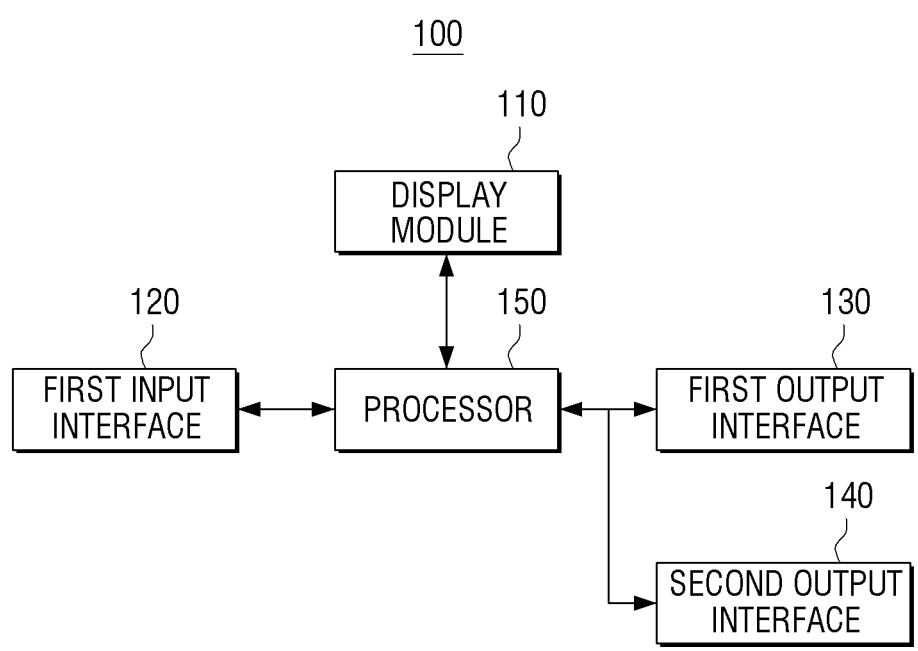
FIG. 2 is a block diagram provided to explain a display apparatus according to an embodiment.

FIG. 2 is a block diagram provided to explain a display apparatus according to an embodiment.

Referring to FIG. 2, a display apparatus according to an embodiment may include a display module 110, a first input interface 120, a first output interface 130, a second output interface 140, and a processor 150.

The display module 110 is configured to display an image corresponding to an image signal received by the display apparatus 100.

The display apparatus 100 may include a plurality of display modules.

The display module 110 may be implemented as an LED display module including inorganic light emitting diode.

Specifically, the display module 110 may be implemented as an LED display module including a plurality of LEDs in which the subpixels of a red LED, a green LED and a Blue LED are implemented as one pixel.

Here, a plurality of pixels may be arranged in a form of matrix (e.g., M×N where M and N are natural numbers). Specifically, the matrix may be in the form of an identical arrangement (e.g., M=N where M and N are natural numbers, 16×16 arrangement, 24×24 arrangement, etc.), or may be in the form of a different arrangement (e.g., WN where M and N are natural numbers).

Meanwhile, the LED of a display module according to an embodiment may be implemented as a micro LED. Here, the micro LED is an LED of about 5 to 100 micrometers in size, and refers to a small light emitting device that emits light without a color filter.

Accordingly, since the display module 110 is composed of a micro LED, the wall display 1000 according to an embodiment may be implemented without a bezel, and may display an image seamlessly between display apparatuses when displaying the image.

However, such an LED display module is an example, and a display module may be implemented as a flat display panel such as a liquid crystal panel (LCP), an organic LED (OLED), an active-matrix OLED (AMOLED) panel, a Plasma Display Panel (PDP), etc.

In this disclosure, it is assumed that a display module according to an embodiment is an LED display module for convenience of explanation.

The first input interface 120 is a component for the display apparatus 100 to receive an image signal.

Specifically, the first input interface 120 may receive an image signal from a display apparatus adjacent to the display apparatus 100 or an external device. Here, the external device may be an electronic apparatus capable of transmitting an image signal to a display apparatus forming a wall display, such as a media box, a server, etc.

The first input interface 120 may include Digital Visual Interface (DVI), Display Port (DP), High Definition Multimedia Interface (HDMI), component, etc. which may receive a video signal or an audio signal. In addition, the first input interface 120 may include an input port for controlling a display apparatus, etc. for receiving a control signal for controlling the display apparatus 100. In addition, the first input interface 120 may include a detection port for checking a connection with a peripheral display apparatus, and may include various other input ports if necessary.

The first input interface 120 may be connected to an adjacent display apparatus or an external device through a cable connected to the above-described various ports. Here, the cable may be a DVI cable, a DP cable, or an HDMI cable depending on a port. However, this is only an example, and various cables may be connected to the first input interface 120.

Meanwhile, in some cases, the display apparatus 100 may include a plurality of input interfaces. In other words, the display apparatus 100 may include a second input interface and a third input interface.

The first output interface 130 and the second output interface 140 are components for the display apparatus 100 to transmit an image signal.

Specifically, the display apparatus 100 may transmit an image signal to a display apparatus adjacent to the display apparatus 100 through the first output interface 130 and the second output interface 140.

The first output interface 130 and the second output interface 140 may include Digital Visual Interface (DVI), Display Port (DP), High Definition Multimedia Interface (HDMI), component, etc. in order to transmit a video signal or an audio signal. In addition, the first output interface 130 and the second output interface 140 may include an input port for controlling a display apparatus in order to transmit a control signal for controlling the display apparatus 100 to another display apparatus. In addition, the first output interface 130 and the second output interface 140 may include a detection port capable of checking a connection with a peripheral display apparatus and may include various other output ports if necessary.

The first output interface 130 and the second output interface 140 may be connected to an adjacent display apparatus or an external device through a cable connected to the above-described various ports. Just like the first input interface 120, the cable connected to the first output interface 130 and the second output interface 140 may be a DVI cable, a DP cable, or an HDMI cable depending on a port. However, this is only an example, and various cables may be connected to the first output interface 130 and the second output interface 140.

Meanwhile, the first output interface 130 and the second output interface 140 may be connected to different display apparatuses in the wall display 1000. Accordingly, the display apparatus 100 may receive an image signal and transmit the same to a plurality of display apparatuses simultaneously.

The first output interface 130 may be connected to a first display apparatus disposed in adjacent to a first side of the display apparatus 100. In this case, the display apparatus 100 may transmit an image signal to the first display apparatus.

The second output interface 140 may be connected to a second display apparatus disposed adjacent to a second side of the display apparatus 100. In this case, the display apparatus 100 may transmit an image signal to the second display apparatus.

For example, if the first output interface 130 is positioned in a lower part of the display apparatus 100, the first output interface 130 may transmit an image signal to a display apparatus disposed adjacent to the lower part of the display apparatus 100. If the second output interface 140 is positioned in an upper part of the display apparatus 100, the second output interface 140 may transmit an image signal to a display apparatus disposed adjacent to the upper port of the display apparatus 100, which will be described in detail with reference to FIG. 3.

Meanwhile, in some cases, the display apparatus 100 may include additional output interfaces. In other words, the display apparatus 100 may include a third output interface and a fourth output interface.

The processor 150 controls the overall operations of the display apparatus 100. To do so, the processor 150 may include one or more of central processing unit (CPU), application processor (AP), or communication processor (CP). In addition, the processor 150 may be implemented as a System on Chip (SoC).

The processor 150 may receive an image signal through the first input interface. As described above, the first input interface may be connected to an external device or the output interface of another display apparatus forming the wall display 1000.

In other words, the processor 150 may receive an image signal through the first input interface 120 connected to an external device, or may receive an image signal through the first input interface connected to the output interface of another display apparatus in the wall display 1000.

Once an image signal is received through the first input interface, the processor 150 may display an image corresponding to the position of the display apparatus 100 in the wall display 1000 through a plurality of display modules based on the received image signal.

Meanwhile, as described above, the image signal may include not only data related to the image displayed on the wall display 1000 but also position information of the plurality of display apparatuses 100-1 to 100-16 forming the wall display 1000.

The processor 150 may extract an image signal corresponding to the position of the display apparatus 100 from the image signal received using the position information of the display apparatus 100, and display the corresponding image through a plurality of display modules.

The processor 150 may transmit the received image signal to the first display apparatus and the second display apparatus forming the wall display 1000 through the first output interface and the second output interface, respectively.

Specifically, the processor 150 may transmit the received image signal to the first display apparatus disposed adjacent to the first side of the display apparatus 100 through the first output interface 130, and may transmit the received image signal to the second display apparatus disposed adjacent to the second side of the display apparatus 100 through the second output interface 140.

To do so, the plurality of display apparatuses forming the wall display 1000 are interconnected, and each display apparatus may transmit/receive an image signal through the first input interface, the first output interface and the second output interface of the display apparatus.

Figure 3:
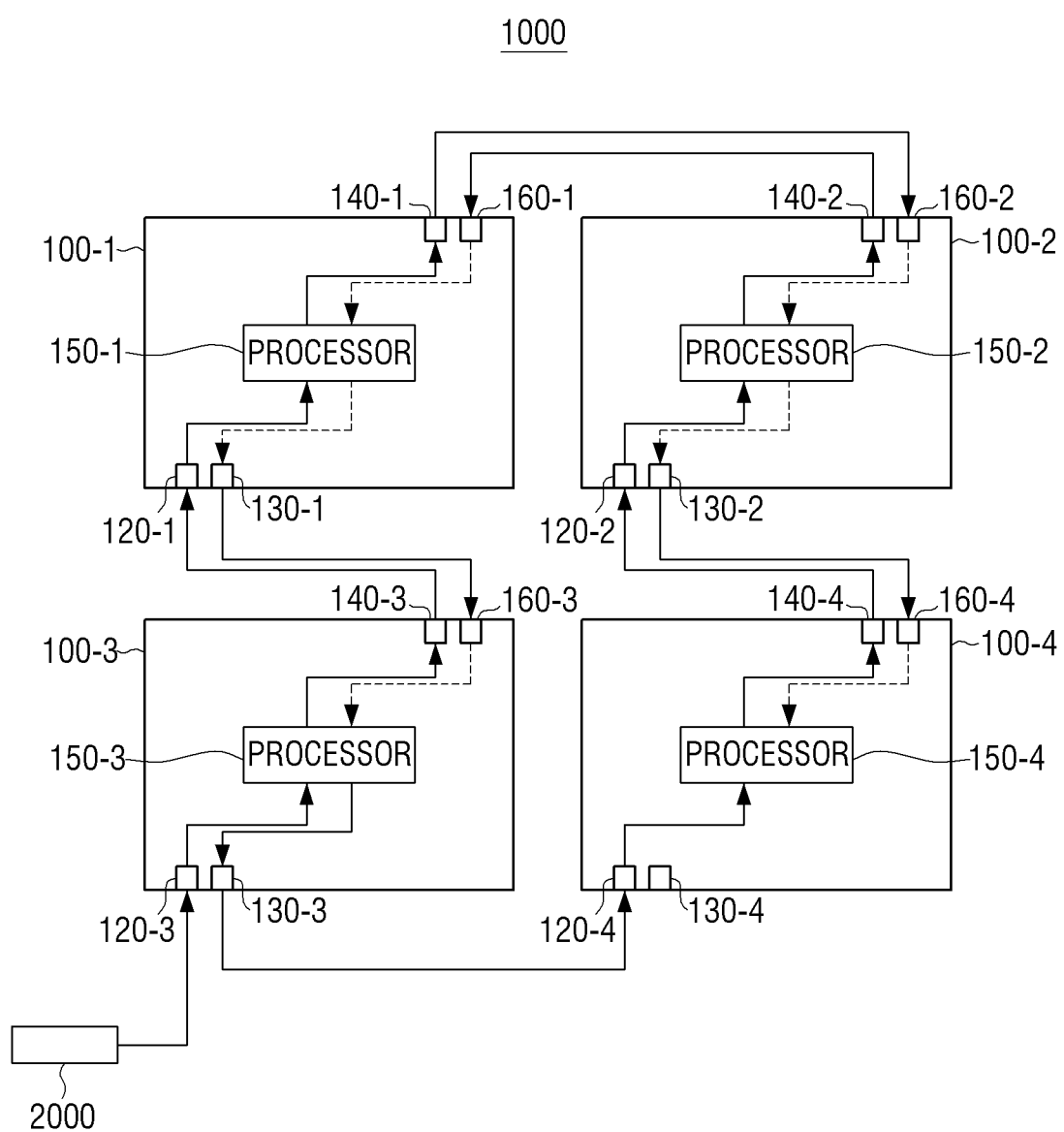
FIG. 3 is a view provided to explain a connection structure between display apparatuses in a wall display and a transmission structure of an image signal according to an embodiment.

FIG. 3 is a view provided to explain a connection structure between display apparatuses in a wall display and a transmission structure of an image signal according to an embodiment.

In FIG. 3, for convenience of explanation, it is illustrated that the wall display 1000 includes four display apparatuses 100-1, 100-2, 100-3, and 100-4.

The display apparatus 100 may be a display apparatus that is disposed at an edge area in the wall display 1000. In other words, the display apparatus 100 according to an embodiment may be one of the four display apparatuses 100-1, 100-2, 100-3, and 100-4. Meanwhile, this is only an example, and the display apparatus 100 according to an embodiment may be disposed regardless of a position in the wall display 1000.

The processor 150-3 of the display apparatus 100-3 may receive an image signal from an external device 2000 through a first input interface 120-3, and the processor 150-3 may transmit the image received through a first output interface 130-3 to the display apparatus 100-4. At the same time, the processor 150-3 may transmit the image signal received through a second output interface 140-3 to the display apparatus 100-1.

The processor 150-4 of the display apparatus 100-4 may receive an image signal from the display apparatus 100-3 through the first input interface 120-4. Here, the first input interface 120-4 of the display apparatus 100-4 may be connected to the first output interface 130-3 of the display apparatus 100-3.

The processor 150-4 may transmit the image received through a second output interface 140-4 to the display apparatus 100-2.

Meanwhile, since there is no display apparatus adjacent to the right side of the display apparatus 100-4, the processor 150-4 may not output an image signal through the first output interface 130-4.

On the other hand, if there is a display apparatus adjacent to the display apparatus 100-4 on the right side of the display apparatus 100-4, the processor 150-4 may transmit an image signal to the display apparatus present on the right side of the display apparatus 100-4 through the first output interface 130-4, which will be described with reference to FIG. 4.

The processor 150-1 of display apparatus 100-1 may receive an image signal from the display apparatus 100-3 through the first input interface 120-1. Here, the first input interface 120-1 of the display apparatus 100-1 may be connected to the second output interface 140-3 of the display apparatus 100-3.

If there is a display apparatus adjacent to the upper side of the display apparatus 100-1, the processor 150-1, just like the processor 150-3, may transmit an image signal to the display apparatus (not illustrated) adjacent to the upper side through the second output interface 140-1.

However, as illustrated in FIG. 3, if there is no display apparatus adjacent to the display apparatus 100-1 on the upper side of the display apparatus 100-1, the processor 150-1 may transmit an image signal to the adjacent display apparatus 100-2.

In this case, the image signal that the processor 150-1 transmits through the second output interface 140-1 may be input to the display apparatus 100-2 through the second input interface 160-2 of the display apparatus 100-2.

In this regard, the display apparatuses 100-1, 100-2, 100-3, and 100-4 may further include the second input interfaces 160-1, 160-2, 160-3, and 160-4 for redundancy of the display apparatuses. In this case, the second input interface may be connected to other display apparatuses 100-1, 100-2, 100-3, and 100-4 which are different from the display apparatus connected to the first input interface 120-1, 120-2, 120-3 and 120-4. In other words, the display apparatuses 100-1, 100-2, 100-3, and 100-4 including the first input interfaces 120-1, 120-2, 120-3, and 120-4 and the second input interfaces 160-1, 160-2, 160-3, and 160-4 may receive an image signal from a plurality of adjacent display apparatuses. Here, the image signal input through the second input interface 160-1, 160-2, 160-3, and 160-4 may be the same as the image signal input through the first input interface 120-1, 120-2, 120-3, and 120-4.

If the display apparatuses 100-1 and 100-2 are adjacent to the upper side of the display apparatuses 100-3 and 100-4, the processor 150-3 and 150-4 may receive an image signal from the display apparatuses 100-1 and 100-2 at the upper side through the second input interfaces 160-3 and 160-4.

The processor 150-2 may receive an image signal from the display apparatus 100-4 through the first input interface 120-2. In this case, the first input interface 120-2 of the display apparatus 100-2 may be connected to the second output interface 140-4 of the display apparatus 100-4.

Just like the case of the display apparatus 100-3, there is no display apparatus adjacent to the upper side of the display apparatus 100-2, the received image may be transmitted to the display apparatus 100-1 through the second output interface 140-2.

The image signal input through the second input interfaces 160-1 and 160-2 of the display apparatuses 100-1 and 100-2 may be transmitted to the display apparatuses 100-3 and 100-4 adjacent to the lower side of the display apparatuses 100-1 and 100-2 through the first output interfaces 130-1 and 130-2 of the display apparatuses 100-1 and 100-2.

In a nutshell, the processor 150-3 may first receive an image signal from the external device 2000. Subsequently, the processor 150-3 may transmit the received image signal to the display apparatus 100-1 and the display apparatus 100-4, respectively.

In this case, the image signal transmitted from the display apparatus 100-3 to the display apparatus 100-1 may be sequentially transmitted to the display apparatus 100-2 and the display apparatus 100-4. The image signal transmitted from the display apparatus 100-3 to the display apparatus 100-4 may be sequentially transmitted to the display apparatus 100-2, the display apparatus 100-1 and the display apparatus 100-3.

As such, a display apparatus may receive an image signal from a plurality of display apparatuses. In this case, the image signal is the image signal transmitted by the display apparatus 100-3 which receives the image signal from the external device 2000 and thus, it may be the same image signal.

In other words, the wall display including a display apparatus according to an embodiment may not transmit the same image signal multiple times for redundancy of the display apparatus.

Meanwhile, in FIG. 3, the second output interfaces 140-1, 140-2, 140-3, and 140-4 and the second input interfaces 160-1, 160-2, 160-3, and 160-4 are illustrated separately, but the second input interface and the second output interface may be implemented as one interface that performs input/output functions simultaneously. The first input interfaces 120-1, 120-2, 120-3, and 120-4 and the first output interfaces 130-1, 130-2, 130-3, and 130-4 may also be implemented as one interface that performs input/output functions simultaneously.

The connection structure of a plurality of display apparatuses and the data transmission structure of FIG. 3 are only an example, and the connection structure and data transmission structure of display apparatuses may vary in a cable connection form between the display apparatuses.

Referring back to FIG. 2, as described above, the processor 150 may receive an image signal through the first input interface 120 and the second input interface. If there is an error in the image signal received through the first input interface 120, the processor 150 may display an image corresponding to the position of the display apparatus 100 in the wall display 1000 through a plurality of display modules 110 based on the image signal received through the second input interface.

As such, even if there is an error in the image signal received by the display apparatus 100, an image may be displayed using a redundancy image signal and thus, the stability of the wall display 1000 including the display apparatus 100 can be maintained.

Meanwhile, unlike the wall display 1000 of FIG. 3, if there are a plurality of display apparatuses disposed in one direction of the display apparatus 100, the image signal may be transmitted in the one direction sequentially.

Figure 4:
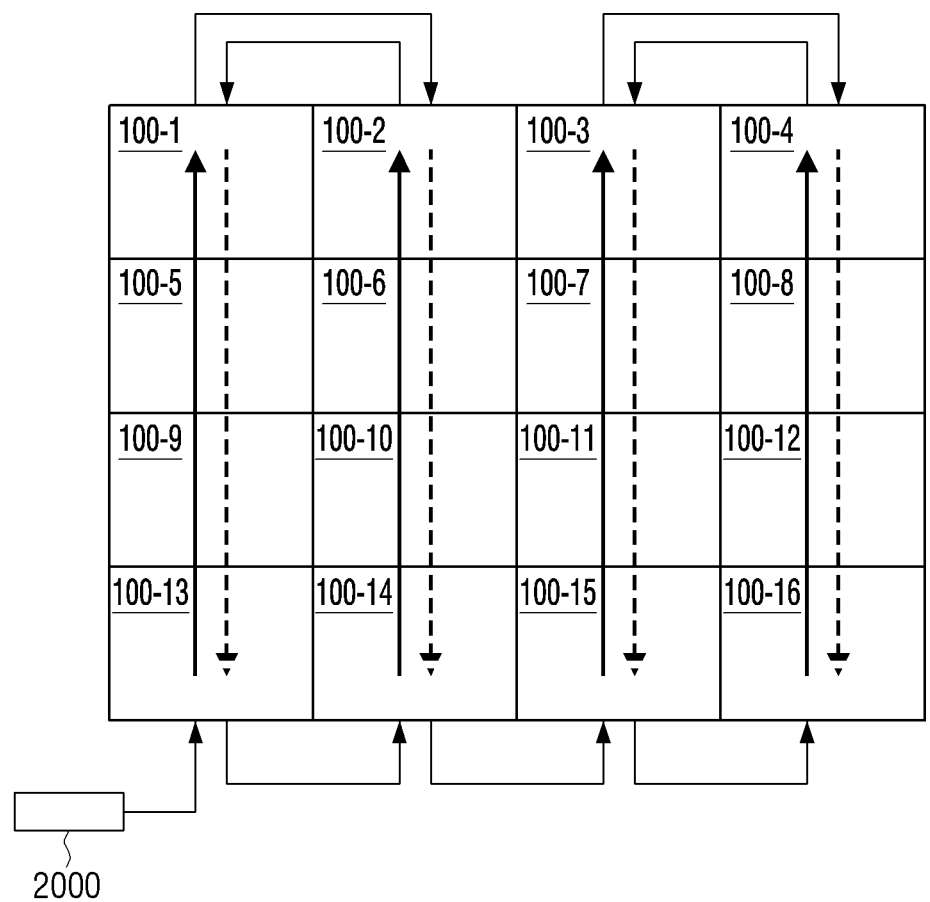
FIG. 4 is a view provided to explain a wall display including a display apparatus according to an embodiment.
Figure 5:
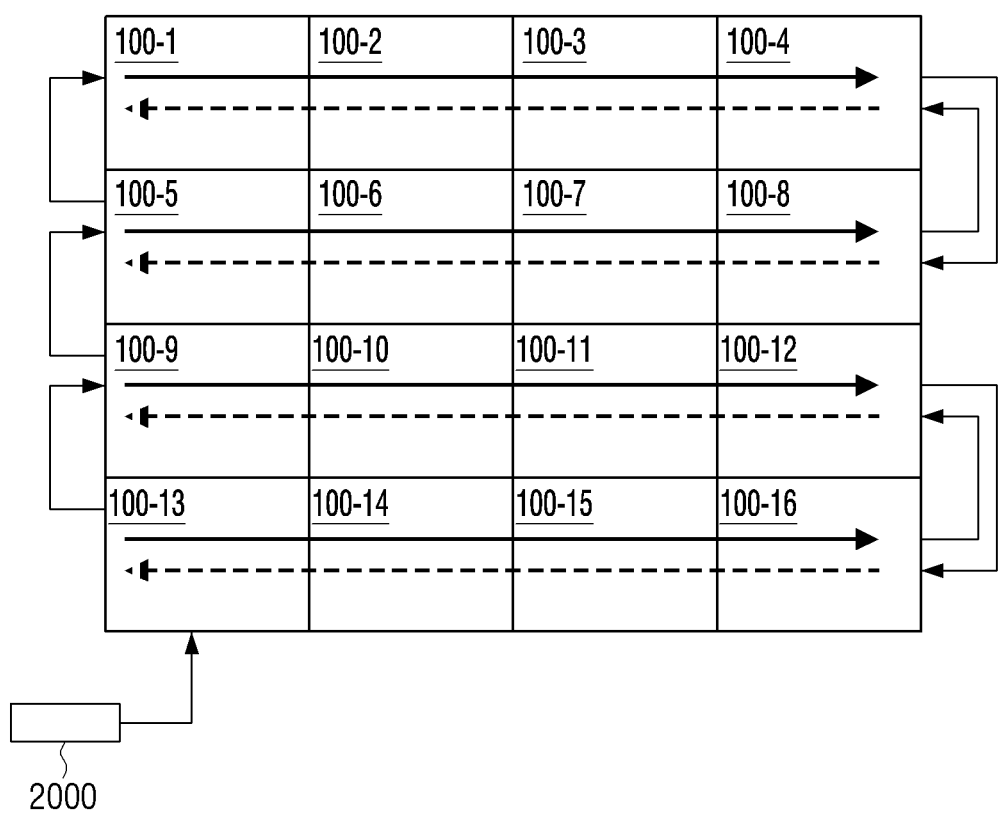
FIG. 5 is a view provided to explain a wall display including a display apparatus according to an embodiment.

In this regard, FIGS. 4 and 5 are views provided to explain a wall display in which an image signal is transmitted sequentially according to an embodiment.

Referring to FIGS. 4 and 5, the wall display may include a total of 16 display apparatuses including 4 horizontally and 4 vertically. However, this is only an example, and the wall display may include more display apparatuses in some cases.

Meanwhile, for convenience of explanation, the first and second interfaces and the first and second output interfaces included in the display apparatus 100 will not be illustrated.

As described above in FIG. 3, if the display apparatus 100-13 receives an image signal from the external device 2000, the processor of the display apparatus 100-13 may transmit the image signal to the display apparatus 100-14 and the display apparatus 100-9.

Specifically, the processor of the display apparatus 100-13 may transmit the received image signal to the display apparatus 100-14 disposed adjacent to the first side of the display apparatus 100-13 through the first output interface of the display apparatus 100-13. In addition, the processor of the display apparatus 100-13 may transmit the received image signal to the display apparatus 100-9 disposed adjacent to the second side of the display apparatus 100-13 through the second output interface of the display apparatus 100-13.

The image signal transmitted to the display apparatus 100-14 through the first output interface of the display apparatus 100-13 may be sequentially transmitted to at least one display apparatus disposed in the first direction of the display apparatus 100-14. For example, the image signal may be sequentially transmitted to the display apparatus 100-15 and the display apparatus 100-16 after going through the display apparatus 100-14.

To do so, the display apparatus 100-14 which receives the image signal from the display apparatus 100-13 transmits the received image signal to the display apparatus 100-15, and the display apparatus 100-15 transmits the received image signal to the display apparatus 100-16 again.

The image signal transmitted to the display apparatus 100-9 through the second output interface of the display apparatus 100-13 may be sequentially transmitted to at least one display apparatus disposed in the second direction of the display apparatus 100-13. For example, the image signal received by the display apparatus 100-13 may be sequentially transmitted to the display apparatus 100-5 and the display apparatus 100-1 after going through the display apparatus 100-9.

To do so, the display apparatus 100-9 that receives the image signal from the display apparatus 100-13 may transmit the received image signal to the display apparatus 100-5, and the display apparatus 100-5 may transmit the received image signal to the display apparatus 100-1 again.

Meanwhile, the display apparatus 100-14 that receives the image signal transmits the image signal also to the display apparatus 100-10. In this case, the image signal is transmitted to the display apparatus 100-10, the display apparatus 100-6 and the display apparatus 100-2 sequentially. Likewise, the image signal may be sequentially transmitted in the column direction from the display apparatus 100-15 and the display apparatus 100-16. In other words, the image signal may be transmitted in the solid arrow direction of the column direction from the display apparatuses 100-13, 100-14, 100-15, and 100-16.

Meanwhile, as described above with reference to FIG. 3, the display apparatuses 100-1, 100-2, 100-3, and 100-4 which do not have a display apparatus adjacent to the upper side may transmit an image signal to an adjacent display apparatus.

Specifically, the display apparatus 100-1 may transmit an image signal to the display apparatus 100-2, and the display apparatus 100-2 may transmit the received image signal to the display apparatus 100-6. In addition, the display apparatus 100-2 may transmit an image signal to the display apparatus 100-1, and the display apparatus 100-1 may transmit the received image signal to the display apparatus 100-5. This is the same for the display apparatus 100-3 and the display apparatus 100-4. In other words, the image signal may be transmitted in the dotted arrow direction of the column direction from the display apparatuses 100-1, 100-2, 100-3, and 100-4.

Meanwhile, referring to FIG. 5, the display apparatus 100-13 that receives an image signal from the external device 2000 transmits the image signal to the display apparatus 100-9 and the display apparatus 100-14, and the received image signal is transmitted to the display apparatus 100-9, the display apparatus 100-5 and the display apparatus 100-1 sequentially, which is the same as the case of FIG. 4.

However, referring to FIG. 5, the first output interface of the display apparatuses 100-1, 100-5, 100-9, and 100-13 is connected to the display apparatuses 100-2, 100-6, 100-10, and 100-14, respectively, and may transmit an image signal to the display apparatuses 100-2, 100-6, 100-10, and 100-14.

As the plurality of display apparatuses 100 in the wall display transmits an image signal through the above method, the image signal may be transmitted in the solid arrow direction of the row direction from the display apparatuses 100-1, 100-5, 100-9, and 100-13. In addition, the image signal may be transmitted in the dotted arrow direction of the row direction again from the display apparatuses 100-4, 100-8, 100-12, and 100-16.

Since the transmission structure of the image signal of FIG. 5 is the same as that of FIG. 4 with only difference in direction, a detailed description thereof will be omitted.

Meanwhile, the wall display 1000 according to an embodiment may add a display apparatus.

Figure 6:
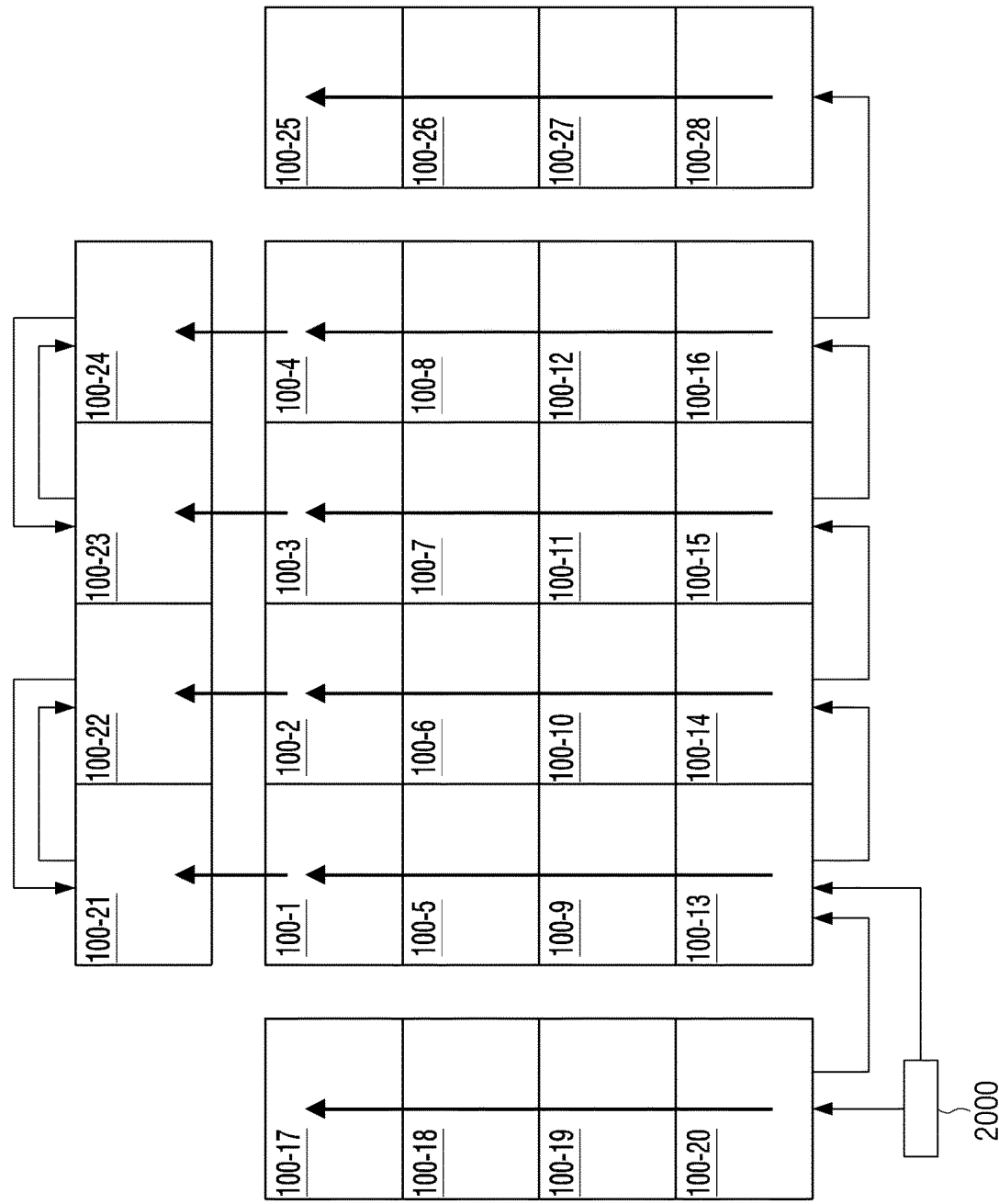
FIG. 6 is a view provided to explain a wall display including a display apparatus according to an embodiment.

FIG. 6 is a view illustrating a case in which a new display apparatus is added to the wall display 1000 including a display apparatus according to an embodiment so that the wall display 1000 is expanded.

If a new display apparatus is added to a wall display and the first input interface 120 is connected to the output interface of the added display apparatus, the processor 150 may receive an image signal from the added display apparatus through the first input interface.

For example, if display apparatuses 100-17, 100-18, 100-19, and 100-20 are added to the left side of the wall display, that is, the left side of the display apparatus 100-13, the first input interface of the display apparatus 100-13 may be connected to the first output interface of the display apparatus 100-20, not the external device 2000.

In this case, the external device 2000 may transmit an image signal to the display apparatus 100-20, and the display apparatus 100-20 may transmit the image signal to the display apparatus 100-19 and the display apparatus 100-13. In addition, the display apparatus 100-13 may receive the image signal from the display apparatus 100-20 through the first input interface of the display apparatus 100-13.

Meanwhile, if a new display apparatus is added to a wall display and the second output interface 140 is added to the input interface of the added display apparatus, the processor 150 may transmit an image signal to the added display apparatus through the second output interface 140.

For example, if display apparatuses 100-21, 100-22, 100-23, and 100-24 are added to the upper side of the wall display, that is, the display apparatuses 100-1, 100-2, 100-3, and 100-4, the second output interface of the display apparatuses 100-1, 100-2, 100-3, and 100-4 may be connected to the first input interface of the display apparatuses 100-21, 100-22, 100-23, and 100-24. In this case, an image signal may be transmitted to each of the display apparatuses 100-21, 100-22, 100-23, and 100-24 through the second output interface included in each of the display apparatuses 100-1, 100-2, 100-3, and 100-4.

This is also true when display apparatuses 100-25, 100-26, 100-27, and 100-28 are added to the right side of the wall display, that is, the display apparatuses 100-4, 100-8, 100-12, and 100-16.

As described above, if a display apparatus is newly added to the wall display 1000 including the display apparatus 100, only the connection of the display apparatus connected to the added display apparatus needs to be re-adjusted, and there is no need to re-adjust the connection between the display apparatuses in the existing wall display 1000. Thus, the expandability of the wall display including a display apparatus can be increased.

Meanwhile, a wall display apparatus according to an embodiment may have various forms.

Figure 7:
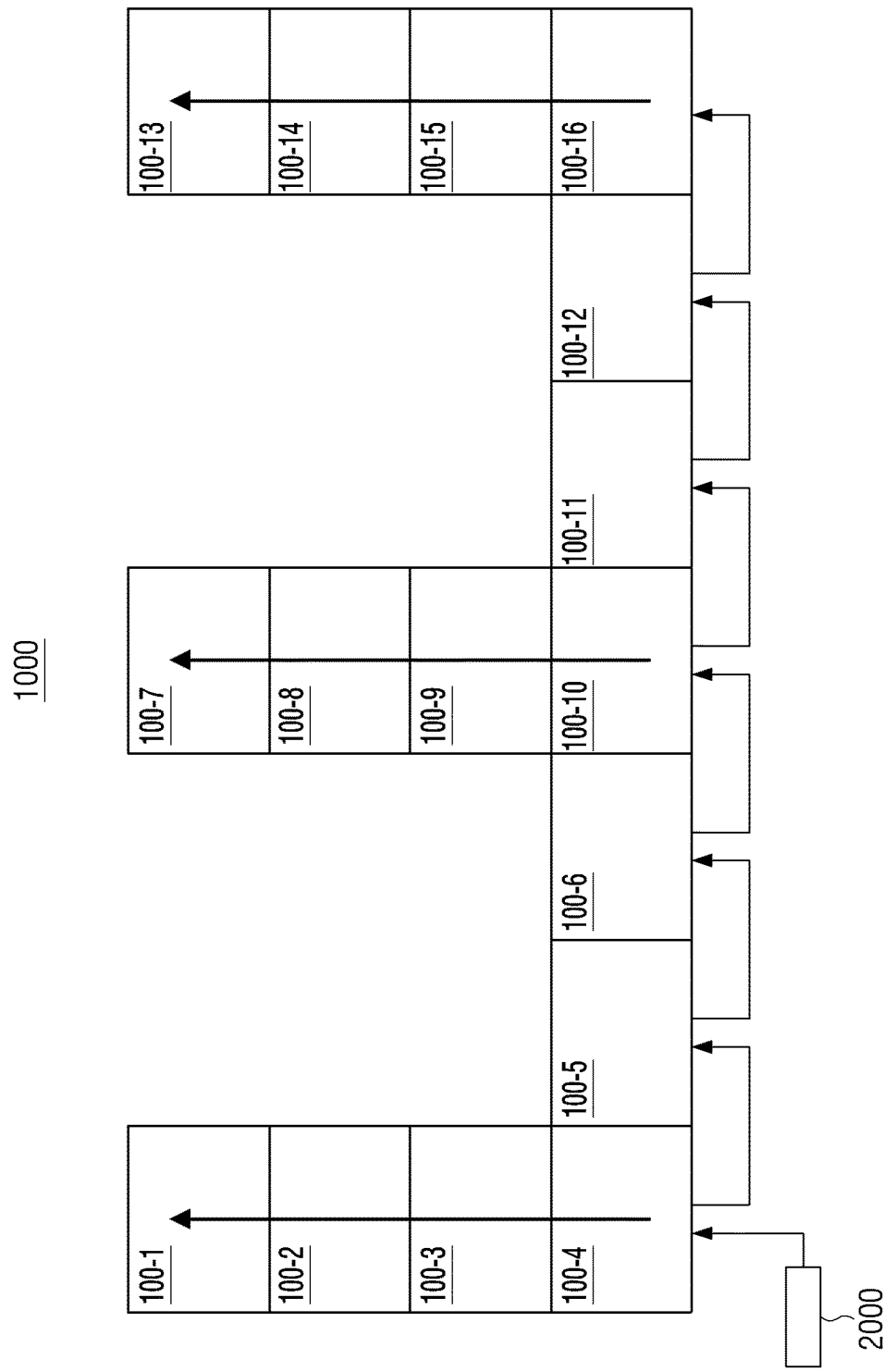
FIG. 7 is a view provided to explain a wall display including a display apparatus according to an embodiment.
Figure 8:
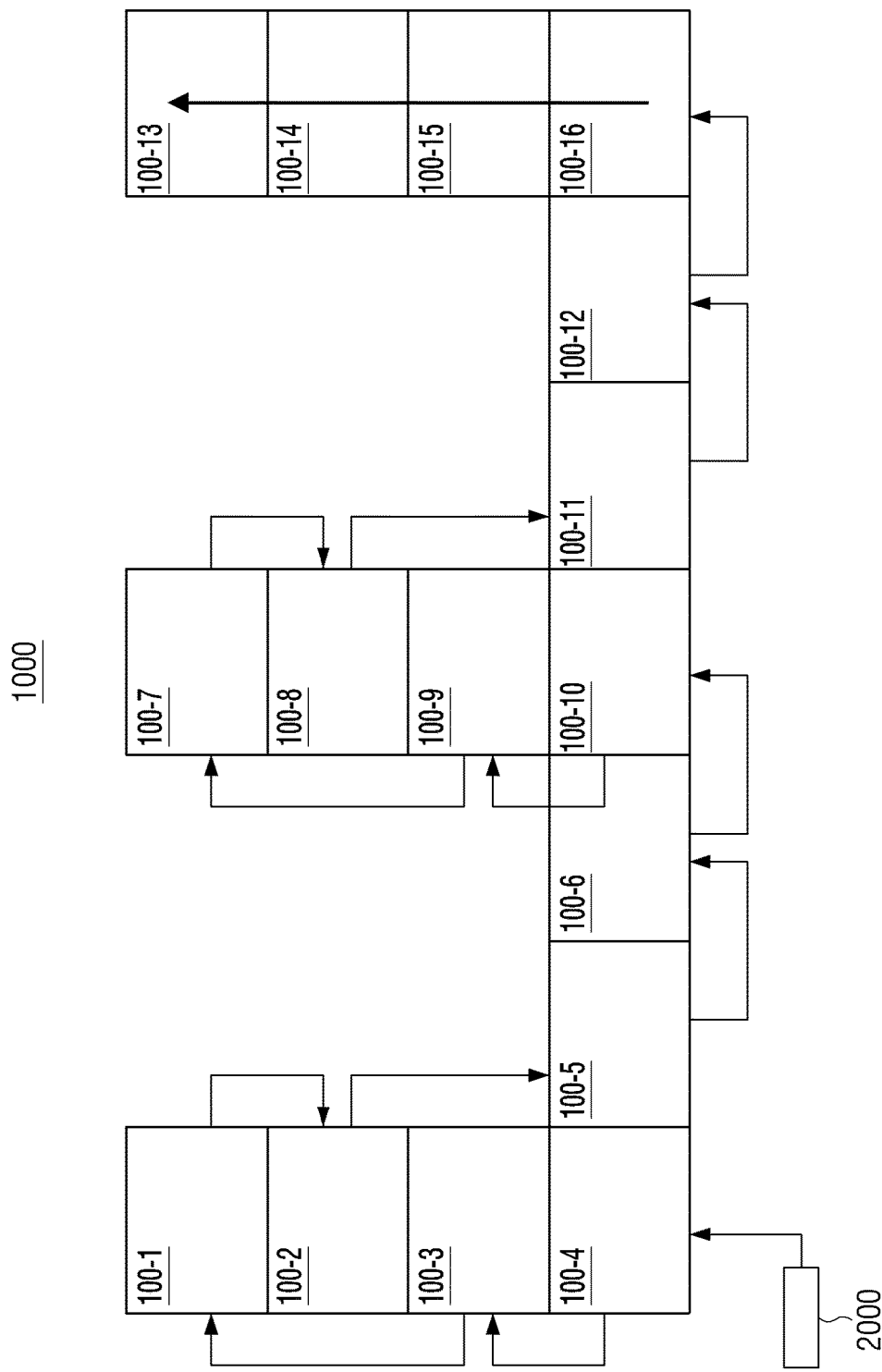
FIG. 8 is a view provided to explain a wall display including a display apparatus according to an embodiment.

In this regard, FIGS. 7 and 8 are views provided to explain a wall display that has various forms, going beyond a conventional rectangular-shaped wall display. Meanwhile, FIGS. 7 and 8 illustrate a wall display in the shape of LII. However, the shape of the wall display is not limited thereto, and may have various forms.

The display apparatus 100-4 forming a wall display 1000, which receives an image signal from the external device 2000 may transmit the image signal to the display apparatus 100-3 and the display apparatus 100-5.

In this case, the image signal may be transmitted to the display apparatus 100-3, the display apparatus 100-2 and the display apparatus 100-1 sequentially.

In addition, the image signal may be transmitted to the display apparatus 100-5, the display apparatus 100-6, the display apparatus 100-10, the display apparatus 100-11, the display apparatus 100-12, and the display apparatus 100-16 sequentially.

In this case, the display apparatus 100-10 may transmit the image signal to the display apparatus 100-11 and the display apparatus 100-9. The image signal transmitted from the display apparatus 100-10 to the display apparatus 100-9 may be transmitted to the display apparatus 100-8 and the display apparatus 100-7 sequentially.

Meanwhile, the image signal may be sequentially transmitted to a plurality of display apparatuses in a wall display as illustrated in FIG. 7, but this is only an example.

In other words, as illustrated in FIG. 8, an image signal may not be transmitted sequentially.

For example, referring to FIG. 8, although the display apparatus 100-10, the display apparatus 100-9, the display apparatus 100-8, and the display apparatus 100-7 are sequentially disposed in the wall display 1000, the image signal may be transmitted in the order of the display apparatus 100-10, the display apparatus 100-9, the display apparatus 100-7, and the display apparatus 100-8 regardless of the physical arrangement of the display apparatuses.

As such, the display apparatus 100 includes a plurality of output interfaces and may transmit an image to a plurality of display apparatuses simultaneously and thus, the structure of transmitting an image signal to a plurality of display apparatuses may be diversified. In addition, the shape of a wall display including the display apparatus 100 may be diversified.

Figure 9:
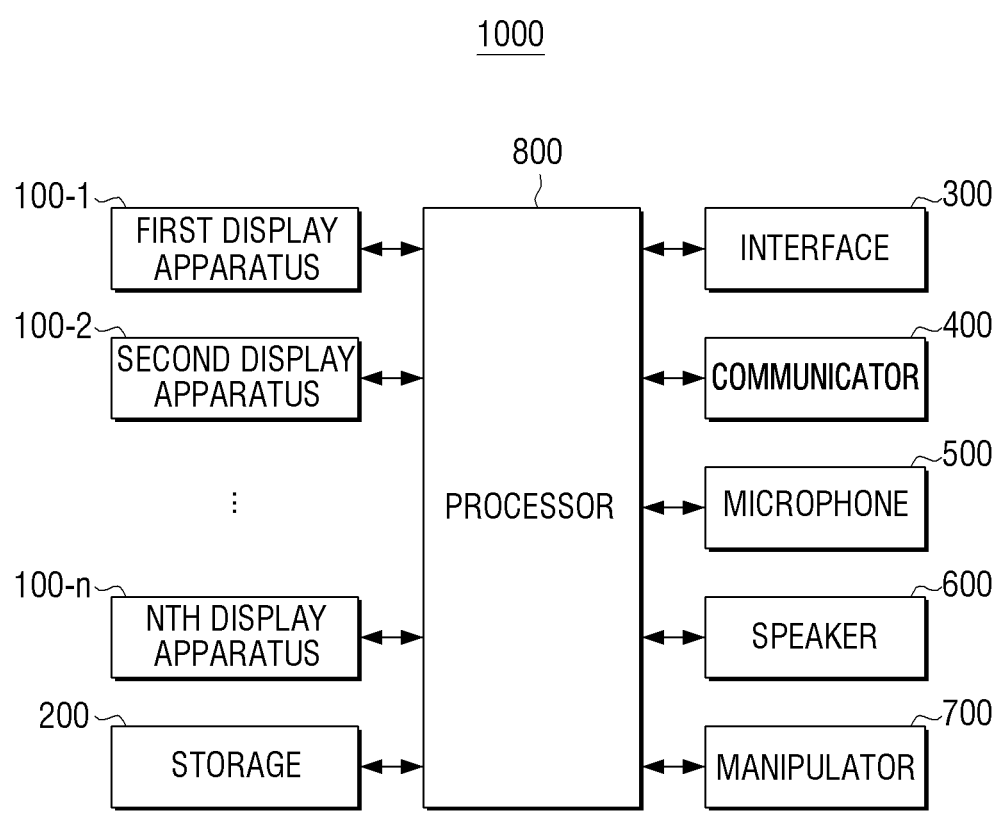
FIG. 9 is a block diagram provided to explain a wall display according to an embodiment.

Meanwhile, FIG. 9 is a block diagram provided to explain a wall display according to an embodiment.

Referring to FIG. 9, the wall display 1000 according to an embodiment may include the first display apparatus 100-1 and the second display apparatus 100-2 to the nth display apparatus 100-n, a storage 200, an interface 300, a communicator 400, a microphone 500, a speaker 600, a manipulator 700, and a processor 800. Hereinafter, portions overlapping with the above description will be omitted or summarized.

The storage 200 may store an Operating System (OS) for controlling the overall operations of the elements of the wall display 1000 and commands or data related to the elements of the wall display 1000.

Accordingly, the processor 800 may control a plurality of hardware or software elements of the wall display 1000 using various commands or data stored in the storage 200, load commands or data received from at least one of the other elements onto a volatile memory and process the same, and store various data in a non-volatile memory.

Meanwhile, the storage 200 may be implemented as various types of storage media. For example, the storage 200 may be implemented as a storage device such as a Read Only Memory (ROM), a Programmable Read Only Memory (PROM), an Erasable Programmable Read Only Memory (EPROM), a non-volatile memory element such as flash memory, or a volatile memory element such as a Random Access Memory (RAM), a hard disk, an optical disk, and the like.

The communicator 400 may transmit/receive various data by performing communication with an external device (not illustrated). For example, the communicator 400 may perform communication with an external device such as a smartphone, etc. to receive a background image, a signal for controlling the wall display 1000, or a signal for controlling the external device. To do so, the communicator 400 may include a wireless communication chip, a Wi-Fi chip, a Bluetooth chip, and the like.

The microphone 500 may receive a user voice. Here, the user voice may be a voice for executing a specific function of the wall display 1000.

Once a user voice for executing a specific function is received through the microphone 500, the processor 800 may convert the user voice to into a digital signal through a Speech to Text (STT) algorithm, and provide response information corresponding to the user voice. Here, the response information may be received not only through an external server, but it also may be generated by the wall display 1000 itself.

The speaker 600 may output various audio signals for which various processing such as decoding, amplification, and noise filtering are performed by an audio processor (not illustrated). In addition, the speaker 600 may output various notification sounds or voice messages. According to an embodiment, the speaker 600 may output an audio signal when the resolution of an image to be displayed on the wall display 1000 is changed.

The manipulator 700 may be implemented as a touch screen, a touch pad, a key button, a key pad, etc.

The processor 800 controls the overall operations of the wall display 1000.

Specifically, the processor 800 may control the hardware or software components connected to the processor 800 by driving an operating system or an application program, and may perform various data processing and operations. In addition, the processor 800 may load and process commands or data received from at least one of other components onto a volatile memory, and store various data in a non-volatile memory.

To do so, the processor 800 may be implemented as a generic-purpose processor (e.g., a CPU or an application processor) capable of performing the corresponding operations by executing a dedicated processor (e.g., an embedded processor) or one or more software programs stored in a memory device.

The processor 800 may control a processor (or a T-controller) included in each of a plurality of display apparatuses to display an image received from an external device (not illustrated) through each of a plurality of display modules, or control a processor included in each of a plurality of display apparatuses to display a pre-stored image through each of a plurality of display modules.

Meanwhile, the wall display 1000 may further include a USB port to which a USB connector may be connected, various external input ports for connecting to various external terminals such as a headset, a mouse, a LAN, etc., a DMB chip to receive and process a Digital Multimedia Broadcasting (DMB) signal, etc.

In addition, the wall display 1000 may further include a broadcast receiver (not illustrated) that receives a broadcast signal from a broadcasting station or a satellite by wire or wirelessly, a signal divider (not illustrated) that divides a broadcast signal received from the broadcast receiver (not illustrated) into an image signal, an audio signal, and additional information signal, an A/V processor (not illustrated) that performs video decoding and video scaling with respect to an image signal and performs audio decoding with respect to an audio signal.

Figure 10:
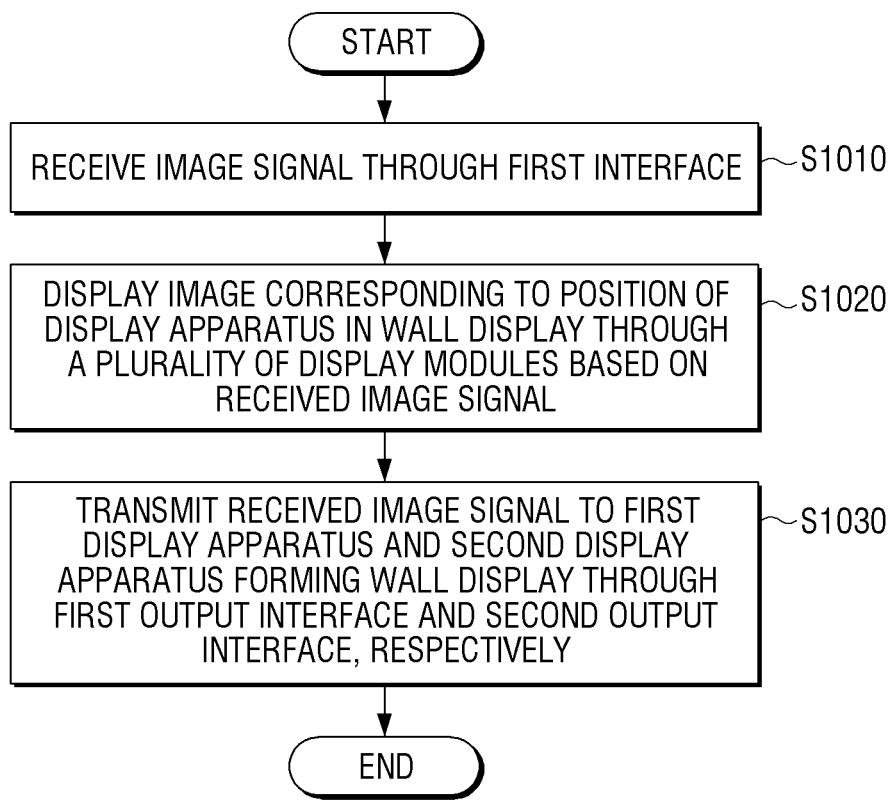
FIG. 10 is a flowchart provided to explain a controlling method of a display apparatus according to an embodiment.

FIG. 10 is a flowchart provided to explain a controlling method of a display apparatus according to an embodiment.

A display apparatus forming a wall display according to an embodiment may receive an image signal through a first input interface (S1010).

In this case, the image signal may be received through the first input interface of the display apparatus connected to an external device, or may be received through the first input interface connected to the output interface of another display apparatus forming a wall display.

Here, the display apparatus may be disposed on an edge area of the wall display.

In addition, an image corresponding to the position of the display apparatus in the wall display may be displayed through a plurality of display modules based on the received image signal (S1020).

The received image signal may be transmitted to the first display apparatus and the second display apparatus forming the wall display through the first output interface and the second output interface, respectively (S1030).

Specifically, the electronic apparatus may transmit the received image signal to the first display apparatus disposed in adjacent to the first side of the display apparatus through the first output interface, and may transmit the received image signal to the second display apparatus disposed adjacent to the second side of the display apparatus through the second output interface.

In this case, the image transmitted to the first display apparatus through the first output interface may be sequentially transmitted to at least one display apparatus disposed in the first direction of the first display apparatus, and the image transmitted to the second display apparatus through the second output interface may be sequentially transmitted to at least one display apparatus disposed in the second direction of the second cabinet.

Meanwhile, if a new display apparatus is added to the wall display and the first input interface is connected to the output interface of the added display apparatus, an image signal may be received from the added display apparatus through the first input interface.

In addition, if a new display apparatus is added to the wall display and the second output interface is connected to the input interface of the added display apparatus, an image signal may be transmitted to the added display apparatus through the second output interface.

Meanwhile, the electronic apparatus may receive an image signal through the second input interface.

In particular, if there is an error in the image signal received through the first input interface, an image corresponding to the position of the display apparatus in the wall display may be displayed through a plurality of display modules based on the image signal received through the second input interface.

Meanwhile, a non-transitory computer readable medium in which a program for sequentially performing a controlling method of a display apparatus forming a wall display according to an embodiment is stored may be provided.

A non-transitory computer-readable medium refers to a medium that stores data semi-permanently, and is readable by machine, but not a medium that stores data for a short moment such as a register, a cache, and a memory. Specifically, the above-described various applications or programs may be stored and provided in a CD, a DVD, a hard disc, a blue-ray disc, a USB, a memory card, a ROM and the like.

While embodiments of the disclosure have been shown and described, with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A display apparatus included in a wall display, the display apparatus comprising:
   a first input interface;
   a second input interface;
   a first output interface;
   a second output interface;
   a plurality of display modules; and
   a processor configured to:
      receive a first image signal through the first input interface,
      transmit the first image signal to a first display apparatus and a second display apparatus that are included in the wall display through the first output interface and the second output interface, respectively,
      receive, from at least one from among the first display apparatus and the second display apparatus through the second input interface, a second image signal which was initially transmitted to the first display apparatus and the second display apparatus through the first output interface and the second output interface, respectively, and
      display an image corresponding to a position of the display apparatus on the wall display, through the plurality of display modules, based on one from among the first image signal and the second image signal.

2. The display apparatus as claimed in claim 1, wherein, in the receiving the first image signal through the first input interface, the processor is further configured to receive the first image signal through the first input interface connected to an external device, or through the first input interface connected to an output interface of a third display apparatus included in the wall display.

3. The display apparatus as claimed in claim 1, wherein the processor is further configured to transmit the first image signal to the first display apparatus disposed adjacent to a first side of the display apparatus through the first output interface, and transmit the first image signal to the second display apparatus disposed adjacent to a second side of the display apparatus through the second output interface.

4. The display apparatus as claimed in claim 3, wherein the first image signal transmitted to the first display apparatus through the first output interface is sequentially transmitted to one or more third display apparatuses disposed in a first direction of the first display apparatus, and the first image signal transmitted to the second display apparatus through the second output interface is sequentially transmitted to one or more fourth display apparatuses disposed in the first direction of the second display apparatus and sequentially transmitted to one or more fifth display apparatuses disposed in a second direction of the second display apparatus.

5. The display apparatus as claimed in claim 1, wherein the processor is further configured to, based on a third display apparatus being newly added to the wall display and the first input interface being connected to an output interface of the third display apparatus, receive the first image signal from the third display apparatus through the first input interface.

6. The display apparatus as claimed in claim 1, wherein the processor is further configured to, based on a third display apparatus being newly added to the wall display and the second output interface being connected to an input interface of the third display apparatus, transmit the first image signal to the third display apparatus through the second output interface.

7. The display apparatus as claimed in claim 1, wherein, in the displaying the image, the processor is further configured to, based on an error in the first image signal received through the first input interface, display the image corresponding to the position of the display apparatus on the wall display based on the second image signal received through the second input interface.

8. The display apparatus as claimed in claim 1, wherein the display apparatus is disposed at an edge area of the wall display.

9. The display apparatus as claimed in claim 1, wherein the first image signal transmitted to the second display apparatus through the second output interface is further sequentially transmitted through one or more third display apparatuses of the wall display that are sequentially disposed adjacent the second display apparatus on a side opposite to the display apparatus and is finally transmitted through the first display apparatus to the second input interface of the display apparatus.

10. A controlling method of a display apparatus included in a wall display, the controlling method comprising:
receiving a first image signal through a first input interface of the display apparatus;
transmitting the first image signal to a first display apparatus and a second display apparatus that are included in the wall display through a first output interface and a second output interface, of the display apparatus, respectively;
receiving, from at least one from among the first display apparatus and the second display apparatus through a second input interface of the display apparatus, a second image signal which was initially transmitted to the first display apparatus and the second display apparatus through the first output interface and the second output interface, respectively; and
displaying an image corresponding to a position of the display apparatus on the wall display, through a plurality of display modules included in the display apparatus, based on one from among the first image signal and the second image signal.

11. The controlling method as claimed in claim 10, wherein the receiving the first image signal through the first input interface further comprises:
receiving the first image signal through the first input interface of the display apparatus connected to an external device, or through the first input interface connected to an output interface of a third display apparatus included in the wall display.

12. The controlling method as claimed in claim 10, wherein the transmitting further comprises:
transmitting the first image signal to the first display apparatus disposed adjacent to a first side of the display apparatus through the first output interface, and
transmitting the first image signal to the second display apparatus disposed adjacent to a second side of the display apparatus through the second output interface.

13. The controlling method as claimed in claim 12, wherein the first image signal transmitted to the first display apparatus through the first output interface is sequentially transmitted to one or more third display apparatuses disposed in a first direction of the first display apparatus, and
the first image signal transmitted to the second display apparatus through the second output interface is sequentially transmitted to one or more fourth display apparatuses disposed in the first direction of the second display apparatus and sequentially transmitted to one or more fifth display apparatuses disposed in a second direction of the second display apparatus.

14. The controlling method as claimed in claim 10, wherein the receiving the first image signal through the first input interface further comprises:
based on a third display apparatus being newly added to the wall display and the first input interface being connected to an output interface of the third display apparatus, receiving the first image signal from the third display apparatus through the first input interface.

15. The controlling method as claimed in claim 10, further comprising:
based on a third display apparatus being newly added to the wall display and the second output interface being connected to an input interface of the third display apparatus, transmitting the first image signal to the third display apparatus through the second output interface.

16. The controlling method as claimed in claim 10, wherein the displaying the image further comprises:
based on an error in the first image signal received through the first input interface, displaying the image corresponding to the position of the display apparatus on the wall display based on the second image signal received through the second input interface.

17. The controlling method as claimed in claim 10, wherein the display apparatus is disposed at an edge area of the wall display.

* * * * *